US008023959B2

(12) United States Patent
Bhuta et al.

(10) Patent No.: US 8,023,959 B2
(45) Date of Patent: Sep. 20, 2011

(54) METHOD AND SYSTEM FOR PERSONAL AREA NETWORKS

(75) Inventors: Mahesh B. Bhuta, Coral Springs, FL (US); Eric T. Eaton, Lake Worth, FL (US); Jorge L. Perdomo, Boca Raton, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 1079 days.

(21) Appl. No.: 11/427,262

(22) Filed: Jun. 28, 2006

(65) Prior Publication Data
US 2008/0004036 A1 Jan. 3, 2008

(51) Int. Cl.
*H04W 24/00* (2009.01)

(52) U.S. Cl. ............... 455/456.1; 455/456.2; 455/456.3; 455/456.5; 455/456.6

(58) Field of Classification Search ............... 455/456.1, 455/456.2, 456.3, 456.5, 456.6
See application file for complete search history.

(56) References Cited

U.S. PATENT DOCUMENTS

| | | | |
|---|---|---|---|
| 5,736,940 A | 4/1998 | Burgener | |
| 5,859,628 A | 1/1999 | Ross et al. | |
| 5,910,782 A | 6/1999 | Schmitt et al. | |
| 5,917,449 A | 6/1999 | Sanderford et al. | |
| 5,963,130 A | 10/1999 | Schlager et al. | |
| 6,081,206 A | 6/2000 | Kielland | |
| 6,084,547 A | 7/2000 | Sanderford et al. | |
| 6,147,624 A | 11/2000 | Clapper | |
| 6,177,905 B1 | 1/2001 | Welch | |
| 6,362,778 B2 | 3/2002 | Neher | |
| 6,542,758 B1 | 4/2003 | Chennakeshu et al. | |
| 6,782,265 B2 | 8/2004 | Perez-Breva et al. | |
| 6,799,047 B1 | 9/2004 | Bahl et al. | |
| 6,865,457 B1 | 3/2005 | Mittelsteadt et al. | |
| 6,888,443 B2 | 5/2005 | Ritter | |
| 6,889,135 B2 | 5/2005 | Curatolo et al. | |
| 6,957,142 B2 | 10/2005 | Entenmann | |
| 6,967,576 B2 | 11/2005 | Hayes et al. | |

(Continued)

FOREIGN PATENT DOCUMENTS

EP 1441235 A2 7/2004

(Continued)

OTHER PUBLICATIONS www.airespace.com., "RF Fingerprinting: Enabling Accurate Location Tracking for WLANs", http://www.airespace.com/technology/technote_rf_fingerprinting.php, 2 pages, website last visited Jun. 28, 2006.

(Continued)

*Primary Examiner* — Daniell L Negron
*Assistant Examiner* — Huy D Nguyen

(57) ABSTRACT

A system (160) and method (400) is provided for validating a location of a tracking device. The method can include monitoring (902) a set of signal strengths (600) to one or more personal area networks (104) and one or more cellular towers (110), generating (906) a Radio Frequency Time Profile RFTP (700) from the set of signal strengths, comparing (908) the RFTP o coverage variation limits (720) of one or more pre-calibrated paths, and signaling (910) an alert if the set of signal strengths are not within the coverage variation limit of the one or more pre-calibrated paths. The RFTP is a time series of the signal strengths between the tracking device and the one or more PANs resulting from a change in location of the tracking device.

12 Claims, 9 Drawing Sheets

U.S. PATENT DOCUMENTS

| | | | |
|---|---|---|---|
| 7,039,427 B2 | 5/2006 | Tachikawa | |
| 7,098,786 B2 | 8/2006 | Dvorak et al. | |
| 7,146,178 B2 | 12/2006 | Lehikoinen et al. | |
| 7,508,300 B2 | 3/2009 | Mock et al. | |
| 7,639,131 B2 | 12/2009 | Mock et al. | |
| 7,705,728 B2 | 4/2010 | Mock et al. | |
| 7,826,409 B2 | 11/2010 | Mock et al. | |
| 2002/0021231 A1 | 2/2002 | Schlager et al. | |
| 2003/0146850 A1 | 8/2003 | Fallenstein | |
| 2003/0222757 A1 | 12/2003 | Ghabra et al. | |
| 2003/0232598 A1 | 12/2003 | Aljadeff et al. | |
| 2004/0145520 A1 | 7/2004 | Richardson et al. | |
| 2004/0156326 A1 | 8/2004 | Chithambaram | |
| 2004/0198392 A1 | 10/2004 | Harvey et al. | |
| 2004/0209594 A1 | 10/2004 | Naboulsi | |
| 2004/0233858 A1* | 11/2004 | Karaoguz | 370/254 |
| 2004/0258021 A1 | 12/2004 | Kashimoto et al. | |
| 2005/0043869 A1 | 2/2005 | Funkhouser et al. | |
| 2005/0068169 A1 | 3/2005 | Copley et al. | |
| 2005/0075116 A1 | 4/2005 | Laird et al. | |
| 2005/0144318 A1 | 6/2005 | Chang | |
| 2005/0197139 A1 | 9/2005 | Misikangas et al. | |
| 2005/0228583 A1 | 10/2005 | Capuano | |
| 2005/0240959 A1 | 10/2005 | Kuhn et al. | |
| 2006/0067286 A1 | 3/2006 | Cornett | |
| 2006/0193284 A1 | 8/2006 | Stieglitz et al. | |
| 2006/0202815 A1 | 9/2006 | John | |
| 2007/0023496 A1 | 2/2007 | Hall | |
| 2007/0034107 A1* | 2/2007 | Barbeau et al. | 104/307 |
| 2007/0082614 A1 | 4/2007 | Mock | |
| 2007/0091858 A1 | 4/2007 | Wu et al. | |
| 2007/0107668 A1 | 5/2007 | Eaton et al. | |
| 2007/0107669 A1 | 5/2007 | Eaton et al. | |
| 2007/0152804 A1 | 7/2007 | Breed et al. | |
| 2007/0225034 A1 | 9/2007 | Schmidt | |
| 2008/0057955 A1* | 3/2008 | Choi-Grogan | 455/435.1 |
| 2008/0200153 A1* | 8/2008 | Fitzpatrick et al. | 455/414.1 |
| 2008/0200160 A1* | 8/2008 | Fitzpatrick et al. | 455/418 |
| 2008/0274752 A1 | 11/2008 | Houri | |
| 2009/0005067 A1* | 1/2009 | Ernst et al. | 455/456.1 |

FOREIGN PATENT DOCUMENTS

| | | |
|---|---|---|
| EP | 1532465 | 5/2005 |
| JP | 05012599 A | 1/1993 |
| JP | 05120599 A | 5/1993 |
| JP | 02204900 A | 8/1999 |
| JP | 2002111806 A | 4/2002 |
| WO | 200173466 A1 | 10/2001 |
| WO | WO 2005060304 | 6/2005 |

OTHER PUBLICATIONS

Mobileguardian LLC, a wholly-owned subsidiary of Nemerex Corp., "MobileGuardian (TM) Sponsors Teen Driver Education Program", Location Tracking and Stolen Vehicle Recovery Solution Can Assist Parents in Monitoring Teen Drivers; Jul. 31, 2003; 2 pages, For-Realease.com; website last visited Oct. 5, 2005.

Bahl, et al., "RADAR: An In-Building RF-based User Location and Tracking System," IEEE 2000, vol. 2, pp. 775-784, Mar. 2000.

United States Patent and Trademark Office, "Non-Final Office Action Summary", Nov. 30, 2007, pp. 1-12, U.S. Appl. No. 11/257,602.

* cited by examiner

METHOD AND SYSTEM FOR PERSONAL AREA NETWORKS

FIELD OF THE INVENTION

The present invention relates to mobile communication devices and, more particularly, to reliable network coverage for location awareness.

BACKGROUND

The use of portable electronic devices and mobile communication devices has increased dramatically in recent years. Mobile communication devices are capable of distributing various forms of media and can also distribute location based information. Mobile communications devices can be equipped with Global Positioning Systems (GPS) for identifying a location of the mobile communication device, and, accordingly, a user of the mobile communication device. The GPS allows a monitoring system to determine a physical position of the user's location through GPS readings. The GPS readings can provide a coordinate of the mobile communication device. Services can be provided in accordance with the location of the mobile device based on the GPS readings. Such services include location aware services which provide custom services based on a location of the user.

A mobile communication device equipped with GPS can also be used to monitor activity, or ensure that a user stays within a certain area. For example, location awareness can be deployed for monitoring children, the elderly, or individuals under a surveillance order. The mobile communication device can be attached to the user to monitor their location and movement. On problem faced with location based systems is to be able to accurately determine the location of the individual when GPS coverage has been compromised. The mobile communication device may at times lose coverage with a GPS satellite. For example, the signals from the mobile communication device may be blocked by physical structures such as buildings or walls. Under these conditions, the location of the mobile communication device is temporarily unavailable. During these times, the location of the user is unknown and uncertain.

Moreover, malicious attempts can be made to trick or confuse the GPS system to provide misleading location information. For example, the mobile communication device can be tampered with to provide false readings. Under this situation, a monitoring system will not only provide inaccurate readings, but it will also be unaware that the readings are misleading. Accordingly, a need therefore exists for a location awareness monitoring system that can verify a location of a mobile communication device and determine when the system readings are misleading.

SUMMARY

Broadly stated, embodiments of the invention are directed to a monitoring system for validating a location of a device. One embodiment of the invention is a tracking system augmented with Global Positioning Systems (GPS) for validating a location of the device. The system can include a tracking device that generates a Radio Frequency Time Profile (RTFP), one or more personal area network units (PANs) communicatively coupled to the tracking device, and one or more cellular towers operatively coupled to the personal area network and the tracking device. The RFTP can be a time signature of communication patterns recorded between the tracking device, the PAN, and the one or more cellular towers that is generated in response to changes in a location of the tracking device when GPS coverage is unavailable. The tracking system can validate a location of the tracking device based on the RFTP. For example, the tracking system can monitor the RFTP for communication pattern transitions, and signal an alert if the communication pattern transitions are outside a coverage variation limit of a monitored location.

Embodiments of the invention also concern a method for generating an RFTP. The method can include tracking and storing GPS readings received by a tracking device for identifying one or more locations of the tracking device, capturing a first set of time-series communication patterns between the tracking device and one or more cellular towers, capturing a second set of time-series communication patterns between the tracking device and one or more Personal Area Networks (PANs), and generating a Radio Frequency Time Profile (RTFP) from the first set of time-series communication patterns and the second set of time-series communication patterns.

Embodiments of the invention also concern a method for validating a location of a tracking device in a personal area network (PAN). The method can include monitoring a set of signal strengths to one or more personal area networks (PANs), generating a Radio Frequency Time Profile (RTFP) from the set of signal strengths, wherein the signal strengths change over time, comparing the Radio Frequency Time Profile to coverage variation limits of one or more pre-calibrated paths, and signaling an alert if the set of signal strengths are not within the coverage variation limit of the one or more pre-calibrated path. The method can further include monitoring a second set of signal strengths to one or more cellular towers and generating the RTFP from the set of signal strengths to the one or more PANs and the second set of signal strengths from the one or more cellular towers. In one arrangement, an alert can be raised if the PAN has moved from a first location to a second location.

If GPS coverage has been lost, a path of the tracking device can be projected based on the RFTP and a last received GPS location. A location of the tracking device can be predicted based on the path, and the location of the tracking device can be validated within a monitored location. If coverage has not been lost, the RFTP can be updated based on a recent GPS location. An alert can be raised if the path deviates outside a coverage variation limit of a pre-calibrated path. If the alert is valid, the coverage variation limit can be enforced, and if the alert is invalid, a coverage variation limit can be extended for reducing a false alarm rate. Moreover, the tracking device provides self-learning aspects that can enhance the RFTP as alarm situations are found to be valid or invalid. The self learning aspects can improve alerting decisions by reducing a false rate of alarms based on a history of alarms in view of the RFTP.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

Figure 1:
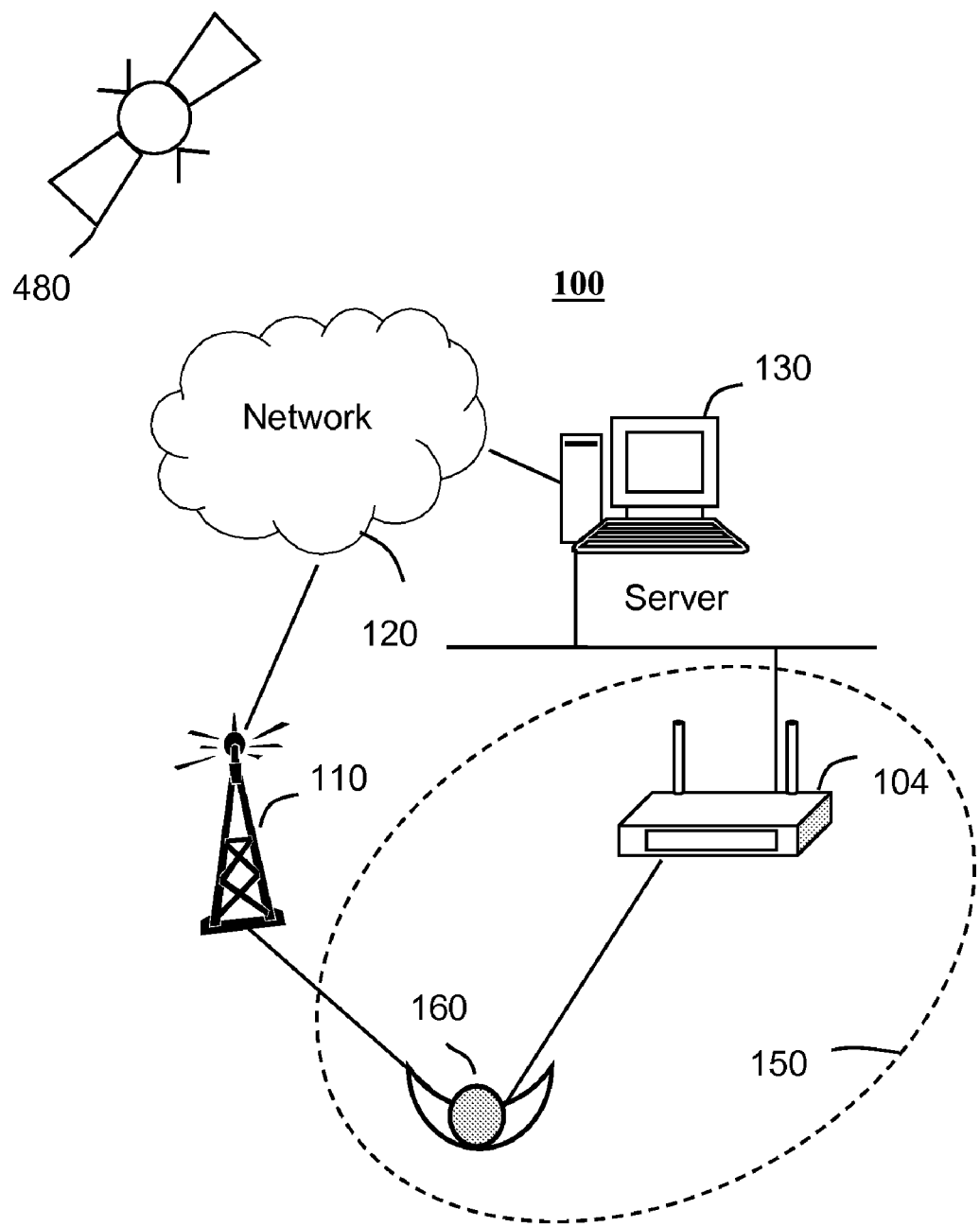
FIG. 1 is a diagram of a tracking device within a mobile communication environment.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "processor" can be defined as any number of suitable processors, controllers, units, or the like that carry out a pre-programmed or programmed set of instructions.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. The term "location" can be defined as a general area. The term geographic boundary can be defined as a bounded region specified by GPS coordinates or other mapping coordinates wherein GPS coverage may be unavailable. The term "communication pattern" is defined as a communication signal between one or more separate communication units. The term "signature" is defined as a communication pattern that is unique and repeatable. The term "external communication system" is defined as any communication device other than a personal area network. The term "coverage variation limit" is defined as a range of acceptable variations in communication patterns. The term time-series communication pattern is defined as a communication pattern that can be recorded and measured over time.

Embodiments of the invention concern a method and system for authenticating a location of a device. The system can include a tracking device having communication with one or more cellular towers and one or more personal area networks (PANs). The PANs are stationary devices that can be placed in locations where global positioning system (GPS) coverage is limited or not available. The tracking device can communicate with the one or more PANs and the one or more cellular towers to evaluate a change in communication signal behaviors when GPS data is unavailable. The changes in the communication signal behavior can be compared to changes associated with a known location of the tracking device, or more specifically, one or more projected locations of the tracking device along a known path. If the change in the communication patterns exceeds a threshold, an alert can be raised, signifying that the tracking device is in an unauthorized location. In particular, the tracking device can monitor a series of time changes in signal strengths between the one or more cellular towers and the one or more PANs. A pattern of the signal strength variation can be compared to pre-calibrated patterns associated with a monitored zone. If the variation in the signal strength exceeds the coverage variation limits, an alert can be raised.

As one example, the device can be attached to a user as a wearable device for validating a location of the user. The location of the user can be validated based on a change in communication patterns between the tracking device and the one or more cellular towers, or the PANs. Understandably, the tracking system can be deployed for monitoring people or objects. For instance, the tracking device can be attached to children for providing parental control within a home network, or within a public area. The tracking system can also be used for monitoring the elderly, such as Alzheimer patients, public offenders, or employees. In one arrangement, a prescribed zone, such as a safe zone, can be established by determining changes in the variation of the communication signals within a geographic region. A location of the device in the geographic region can be validated by monitoring for unexpected changes in the communications signals. An unexpected change is a variation in the communication signal that is outside a coverage limit variation. In particular, one or more communication signals can be monitored for a transition signature, which can be used to validate a location of the tracking device. For example, the tracking system can identify a transition signature when the tracking device falls outside a coverage area. Moreover, the tracking system can associate changes in the communication signals with geographic locations for learning new monitoring paths, that is, paths that are monitored.

Referring to FIG. 1, a tracking system 100 for validating a location of a tracking device 160 is shown. The tracking system 100 can provide wireless connectivity over a radio frequency (RF) communication network or a Personal Area Network (PAN). Communication within the tracking system 100 can be established using a wireless, copper wire, and/or fiber optic connection using any suitable protocol (e.g., TCP/IP, HTTP, etc.). In one arrangement, the tracking device 160 can communicate with one or more cellular towers 110 using a standard communication protocol such as CDMA, GSM, or iDEN. The cellular towers 110, in turn, can connect the tracking device 160 to the Internet 120 over a packet switched link. The Internet 120 can support application services and service layers for providing location information to the tracking device 160, such as monitoring services. The tracking device 160 can also connect to other communication devices through the Internet 120 using a wireless communication channel. The tracking device 160 can establish connections with the server 130 on the network and with other devices on the network for exchanging data and information. For example, the server 130 can host application services directly, or over the Internet 120. Applications can include monitoring applications for tracking and validating a location of the tracking device 160.

The tracking device 160 can also connect to the Internet 120, or the one or more cellular towers 110, over a Personal Area Network (PAN) 104. Notably, the tracking device can establish a secure connection to the one or more communication devices in the mobile communication network 100. The one or more cellular towers 110 can also be base stations. Personal Area Networks (PANs) provide wireless access to the mobile communication environment 100 within a local geographical area 150. In one arrangement, the PAN 104 may be communicatively coupled with the server 130 over a wireless area network connection. In another arrangement, the PAN 104 can communicate directly with the one or more cellular towers 110. In a typical PAN implementation, the physical layer can use a variety of technologies such as 802.11b or 802.11g Wireless Local Area Network (WLAN) technologies. The physical layer may use infrared, frequency hopping spread spectrum in the 2.4 GHz Band, or direct sequence spread spectrum in the 2.4 GHz Band, or any other suitable communication technology. In particular, the tracking device 160 can send and receive data to the server 130 or other remote servers on the mobile communication environment 100.

The tracking device 160 can be a cell-phone, a personal digital assistant, a portable music player, an electronic map, a navigation system or any other suitable communication device. The tracking device 160 can communicate with the PAN 104 according to the appropriate wireless communication standard. In one embodiment of the present invention, the tracking device 160 is equipped with an IEEE 802.11 compliant wireless medium access control (MAC) chipset for communicating with the PAN 104. IEEE 802.11 specifies a wireless local area network (WLAN) standard developed by the Institute of Electrical and Electronic Engineering (IEEE) committee. The standard does not generally specify technology or implementation but provides specifications for the physical (PHY) layer and Media Access Control (MAC) layer. The standard allows for manufacturers of WLAN radio equipment to build interoperable network equipment.

The tracking system 100 can monitor one or more communication signals from the tracking device 160 to the PAN 104 and the cellular towers 110. The tracking system 100 can include more than one cellular tower and more than one PAN. The satellite 480 can provide GPS readings to the tracking device and the PAN. The tracking system 100 can validate a location of the tracking device 160 when the device is in a location where GPS location coverage is not provided. Broadly stated, the tracking system 100 augments an inability of a GPS system to provide location data by projecting a location of the tracking device 160 based on previous GPS data and validating the location based on a transitory change of the communication signals.

Figure 2:
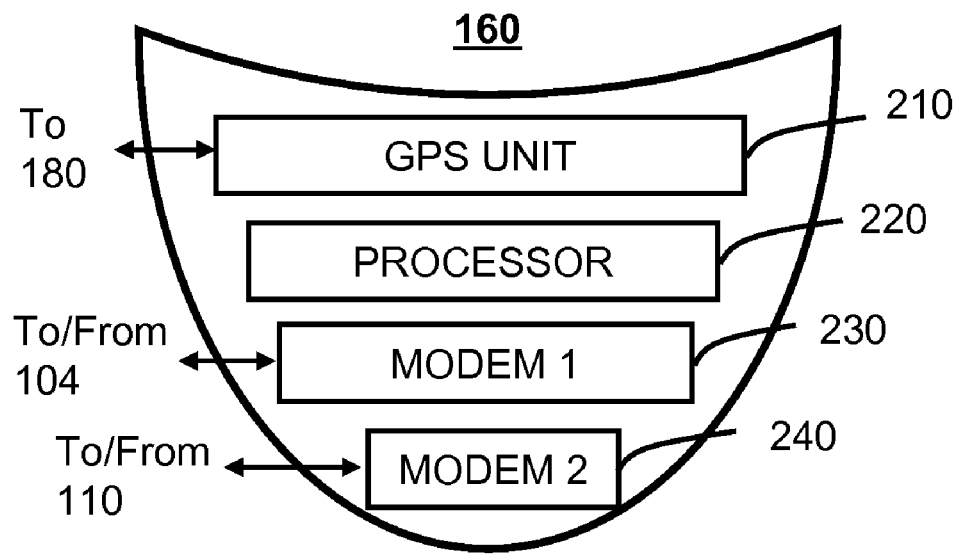
FIG. 2 is a schematic of a tracking device in accordance with the embodiments of the invention.

Referring to FIG. 2, a tracking device 160 for generating a Radio Frequency Time Profile (RTFP) is shown. RFTP is a time signature of communication patterns between the tracking device 160 and one or more separate communication units. As an example, RFTP is a time signature of communication patterns between the tracking device 160, the one or more PANs 104, and/or the one or more cellular towers 110 that is generated in response to changes in a location of the tracking device 160. The tracking device 160 can include a GPS unit 210 for receiving GPS data and identifying a location of the tracking device, a processor 220 for processing one or more communication signals processed by the tracking device, a first modem 230 for communication with one or more PANs 104, and a second modem 240 for communication with one or more cellular towers 110.

The first modem 230 and the second modem 240 can acquire a coverage pattern from one or more cellular towers and at least one personal area network unit. The processor 210 can then determine whether a variation in the coverage pattern is within a monitored location. For example, the processor captures one or more RF signals from the first modem 230, determines a signal strength of the one or more RF signals, and compares the coverage pattern with a coverage variation limit of a monitored location. The first modem 230 and second modem 240 are shown as separate modules for the purpose of illustration only. The modulation and demodulation processes of the first modem and second modem can be performed on the same processor.

The processor 220 can track and store GPS readings, such as positional data, cellular communication signals, and a PAN coverage. For example, the processor 220 can monitor GPS data received from the GPS unit 210, and save a history of locations to a memory within the tracking device. Understandably, the GPS unit 210 can provide positional information when the tracking device 160 is within a GPS coverage. When GPS coverage is not available, the tracking device 160 may not rely on GPS data to determine a location. In this case, the tracking device 160 can rely on the previously received GPS readings and the RTFP for validating a location of the tracking device 160.

In particular, the processor 220 can monitor one or more communication signals from the modem 230 to the one or more cellular towers 110. As an example, the processor 220 can monitor a signal strength to the one or more communication towers 110, and save a log of the signal strengths. For example, a signal strength can be calculated from one or more cellular communication signals received by the modem 230. Moreover, the processor can monitor a PAN coverage to one or more PANs. For example, a signal strength can be calculated from one or more PAN communication signals received by modem 240. A strength of the communication signals to the cellular towers 110 and the PAN coverage can be calculated periodically.

Initially, the processor 220 can determine a valid time and location sequence of the communication signals and PAN coverage to characterize a safe zone. For example, when the tracking device 160 has GPS coverage, the processor 220 can synchronize with the cellular towers 110 and the PAN 104 to determine a reference time and reference location of the PAN. The reference location can identify a location of the PAN 104, and the reference time can identify when the location of the PAN 104 was determined. For example, the location of the PAN 104 can correspond to a first location at a first time, and a second location at a second time. In practice, it is not expected that the PAN will move during a monitoring of the tracking device 160. In principle, the PAN 104 is expected to be in a fixed location. However, a user attempting to thwart monitoring activity may attempt to move the PAN 104. When the PAN 104 is in a known location, the tracking system can identify a location of the tracking device. However, if the PAN is maliciously moved to a new location, the PAN may incorrectly determine a location of the tracking device 160. Understandably, the reference location and reference time allow the tracking system 100 to recalibrate and determine any tampering activity associated with the tracking device. The position detector 350 (See FIG. 3) can communicate with the satellite 480 to receive a GPS reading for determining a location of the PAN, if GPS coverage is available.

Notably, the PAN 104 can be positioned relative to the one or more cellular towers 110. When GPS coverage is lost, or uncertain, the processor 220 can compare a time signature of recent movements to that of the reference location. The processor 220 can also evaluate an authenticity of a location reported by the PAN 104. The PAN 104 can periodically report a location of the tracking device 160 to a remote system, such as the server 130 in FIG. 1. For example, the tracking system 100 may be used to track a location of person having the tracking device 160. The server 130 can communicate with one or more systems over the Internet for providing the monitoring activity. For instance, one or more service providers can provide monitoring activity of the tracking device 160 over the Internet 120 in a secure setting.

Figure 3:
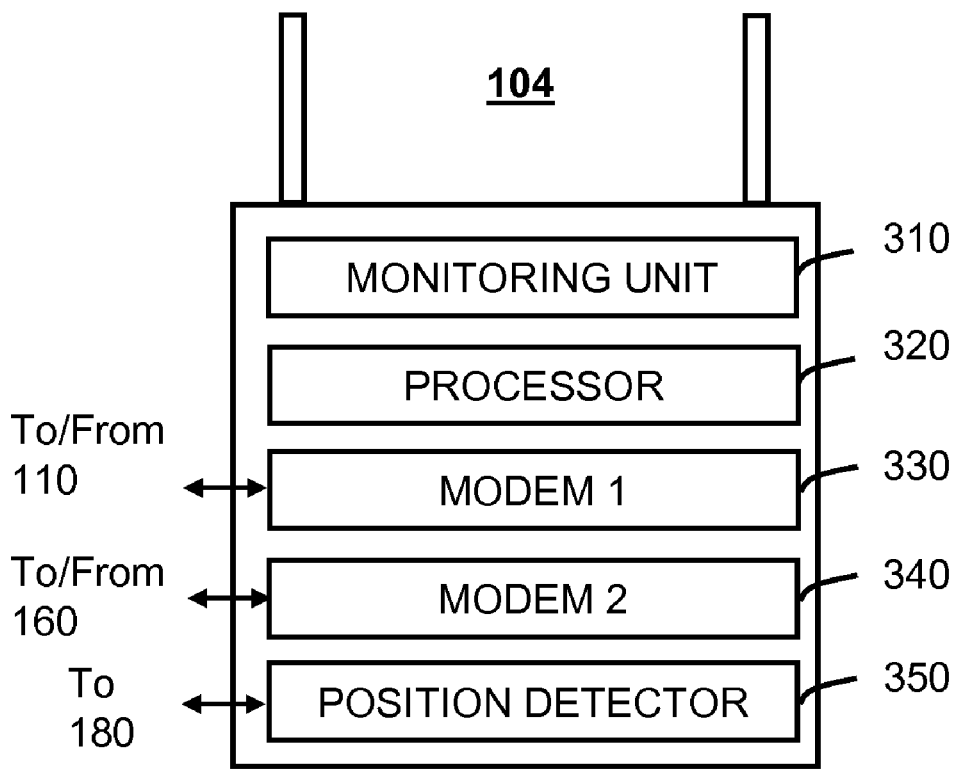
FIG. 3 is a schematic of a Personal Area Network (PAN) in accordance with the embodiments of the invention.

Referring to FIG. 3, components of the PAN 104 are shown. The PAN 104 can include a monitoring unit 310 for monitoring one or more changes of a communication signal to a tracking device, a processor 320 for validating a location of the tracking device, a first modem 330 for establishing communication with one or more cellular towers or other PANs, and a second modem 340 for establishing non-network assisted communication with the tracking device. The monitoring unit 310 can compare the RTFP of a tracking device 160 with one or more communication patterns from the one or more cellular towers 110 or other PANs 104.

The PAN 104 can further include a position detector 350 for determining a location of the PAN. Understandably, the PAN can establish a reference point for the tracking device 160 when a coverage is lost. Also, because the tracking device 160 may be used to monitor dubious activity, that the PAN be located in a known position. Accordingly, the position detector 230 in the PAN 104 can determine whether the PAN has been tampered with; that is whether the PAN has moved from a reference location. For example, on power-up, or at a time when the unit is authenticated, a location of the PAN 104 can be determined via GPS readings, or through a servicing arrangement, wherein the physical position is hard-coded in the device.

Figure 4:
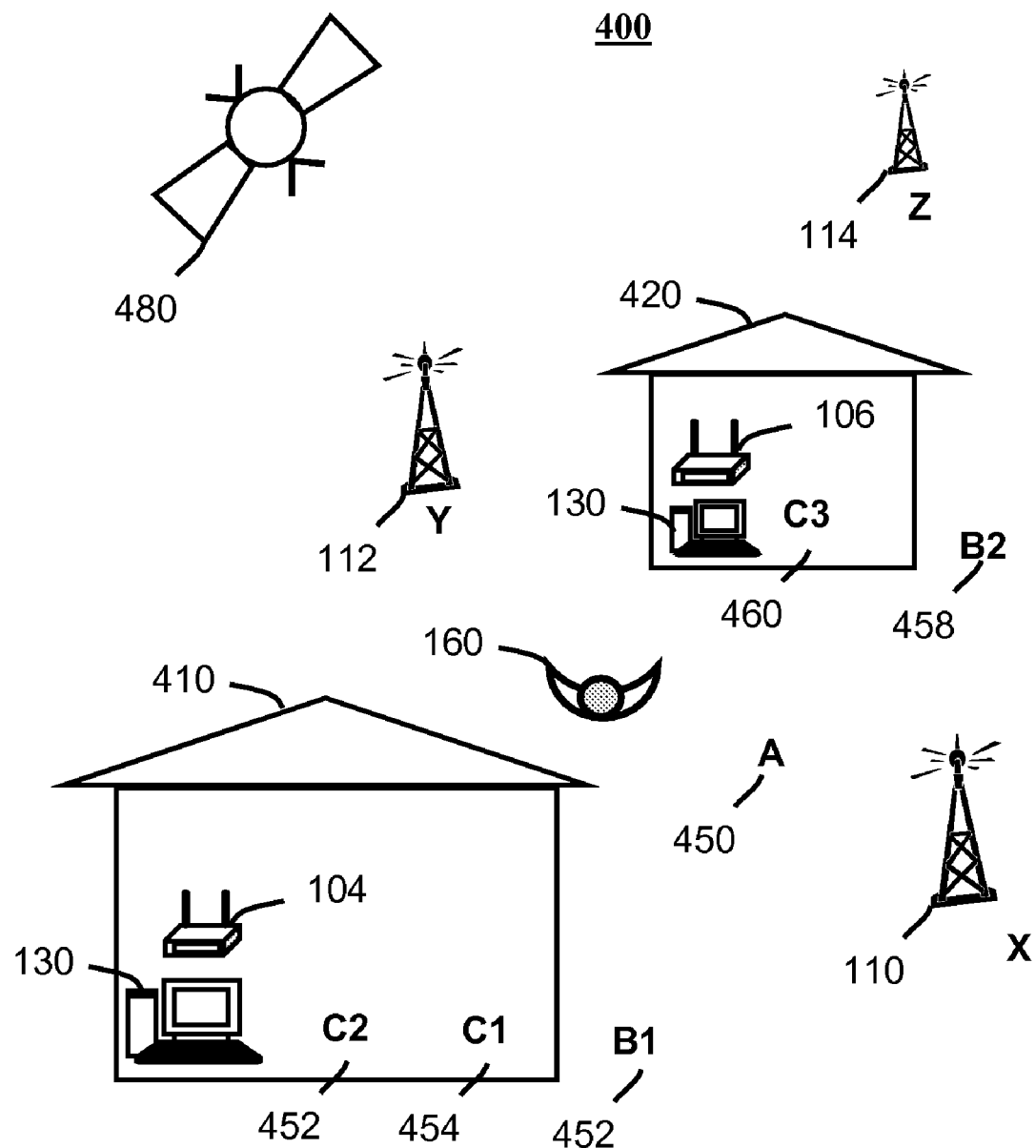
FIG. 4 is a diagram presenting one or more coverage areas in accordance with the embodiments of the invention.

Referring to FIG. 4, an exemplary tracking device scenario 400 is illustrated. In particular, the scenario 400 illustrates coverage areas for validating a tracking device 160 when GPS coverage is unavailable. The operation of the tracking device 160 is not limited to the physical arrangement and placement of the devices and components shown in FIG. 4. Various arrangements of the devices for validating a coverage of the tracking device 160 are herein contemplated. In the foregoing, a brief description of the coverage areas for the tracking device 160 is presented. Notably, the description of the tracking device 160 is discussed in relation to a coverage of one or more cellular towers and a coverage of one or more PANS for validating a location of the tracking device 160, although the invention is not so limited.

In scenario 400, the home 410 in the foreground can be considered a legitimate location. In contrast, the home 420 in the background can be considered an unauthorized location. A legitimate location corresponds to an allowed location of the tracking device 160. For example, the tracking device 160 may be attached to a user that is required to stay within an authorized location, such as the home 410. Understandably, one objective of the tracking system is to determine, within a measure of confidence, if the user has left the authorized location. Another objective is to validate a location of the user when GPS coverage is unavailable based on previous GPS readings and the RFTP. Initially, the tracking device 160 can establish an RFTP that corresponds to the authorized location of the home 410. For example, the RFTP can be synchronized (e.g. calibrated) with the PAN 104 for establishing the authorized location and the RFTP.

Also, as a result of the synchronization (e.g. calibration), the tracking device 160 knows that location B1 (452) corresponds to intermittent GPS readings when the tracking device is at location B1 (452). That is, the tracking device 160 has a priori knowledge of coverage conditions due to the synchronization of the tracking device at a reference location, such as the home 410, based on the RFTP. At location B1 (452), the tracking device 160 will also be visible to the PAN 104 within the home 410. At location B1 (452), the tracking device 160 will also have the cellular tower X (110) as its prime cell and cellular tower Y (112) as a distant signal. Accordingly, RFTP can be evaluated for validating a location of the tracking device 160 within location B1 because cellular coverage is available.

Location A (450) has GPS coverage from the satellite 480, as well as visibility to cellular towers X (110), Y (112), and Z (114). Accordingly, the cellular towers can validate a location of the tracking device at location A (450) based on the RFTP. As previously noted, Location B1 (452) is where GPS coverage is becoming intermittent or non-existent. Accordingly, the tracking device 160 still has cellular coverage at location B1, though, is entering coverage of the home PAN 104. The location of the tracking device 160 at location B1 can thus be validated based on the RFTP which is available to the PAN 104. The location of the tracking device 160 can also be determined by the cellular towers X (110) and Y (112) at location B1.

Location C1 (454) has no GPS visibility from the satellite 480, though it does have cellular coverage to cellular tower X (110) and Y (112). Accordingly, a tracking device 160 within location C1 (454) can be validated by a home computer 130 or set-top box connected to the PAN 104. That is, the PAN 104 can validate a location of the tracking device 160 as an authorized location based on the RFTP. Location C2 (452) has no GPS or cellular coverage, though a tracking device 160 at location C2 (452) can be detected by the home PAN 104. That is, an RFTCP of the tracking device 160 at location C2 (452) can be validated because the PAN 104 can communicate with the tracking device 160.

In contrast, Locations B2 (458) and C3 (460) are unauthorized locations. At location C3 (460) the tracking device may not have GPS coverage or cellular coverage. Accordingly, when the tracking device 160 is in either location B2 (458) or C3 (460), the PAN profile can be very similar to the PAN profile of the foreground home 410. That is, from the perspective of the tracking device 160, the signals received from PAN 106 at location B2 are similar to the signals received from PAN 104 at location B1. However, the RFTP reveals that the tracking device 160 lost GPS connectivity from the satellite 480 under a different latitude and longitude. Moreover, the cellular coverage at location B2 reveals that the prime cellular tower for tracking device 160 at location B2 (458) is X, which is different from the RFTP of the tracking device 160 at location B1 (452). Notably, the coverage conditions have changed in accordance with a movement of the tracking device 160 though GPS coverage is unavailable. The tracking system can consider this an alert situation.

Figure 5:
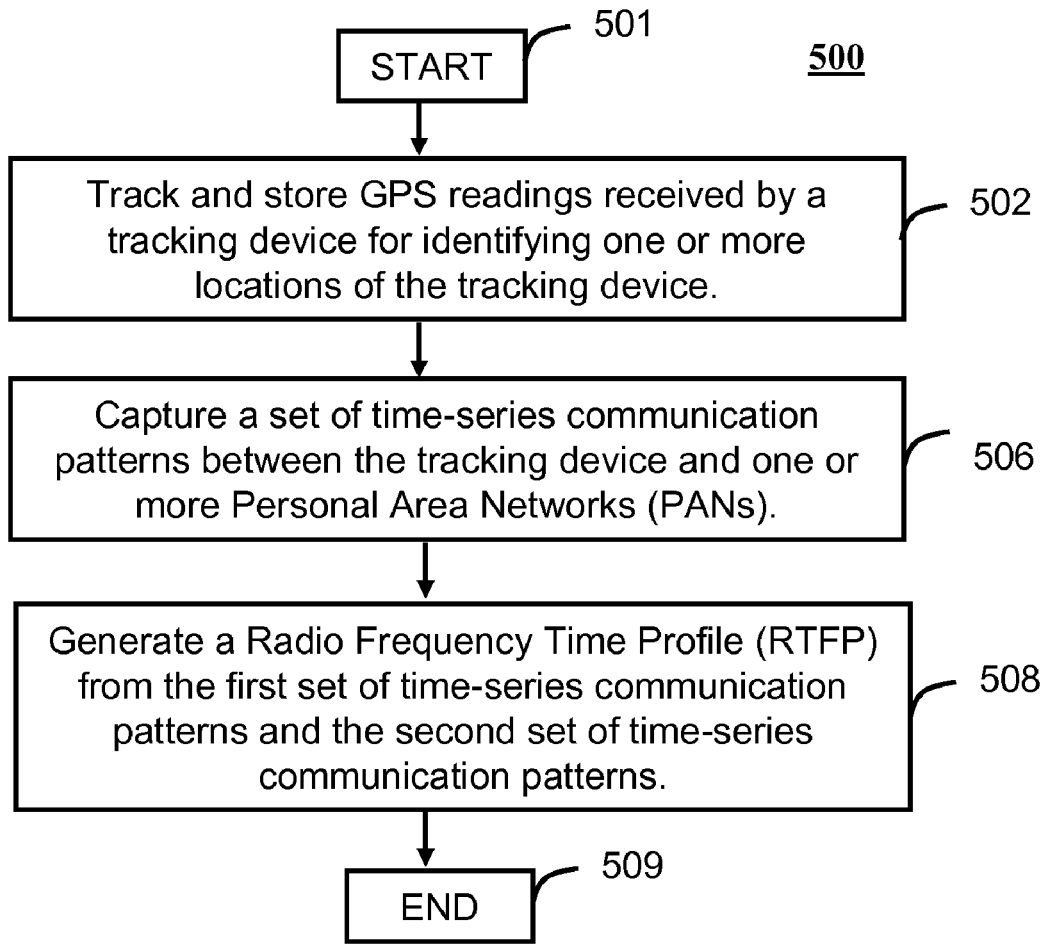
FIG. 5 is a method for generating a RFTP in accordance with the embodiments of the invention.
Figure 6:
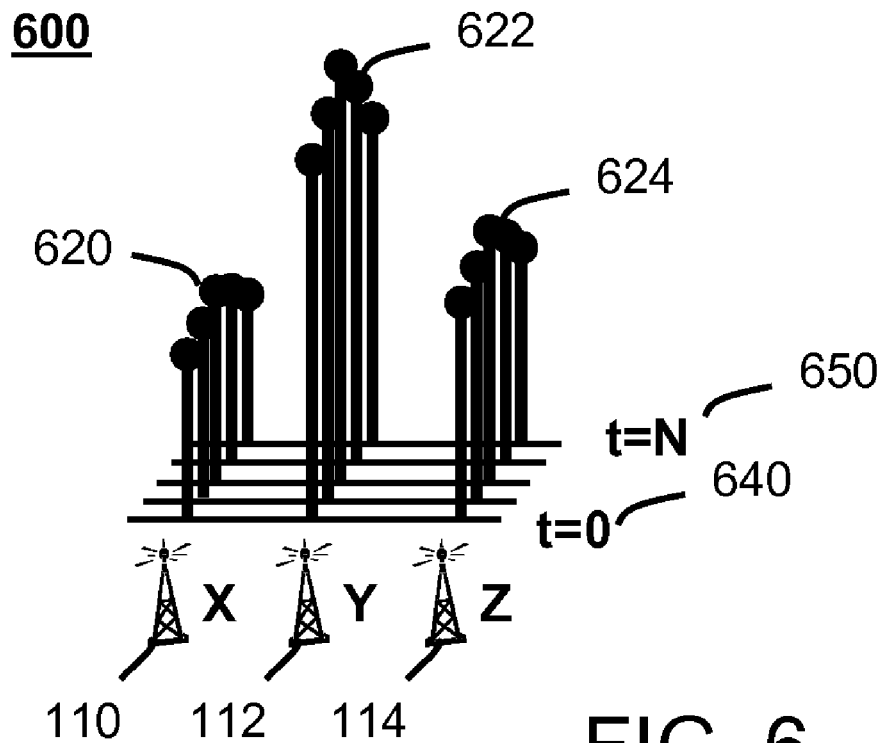
FIG. 6 is a plot of a time-series communication signal within a coverage variation limit in accordance with the embodiments of the invention.
Figure 7:
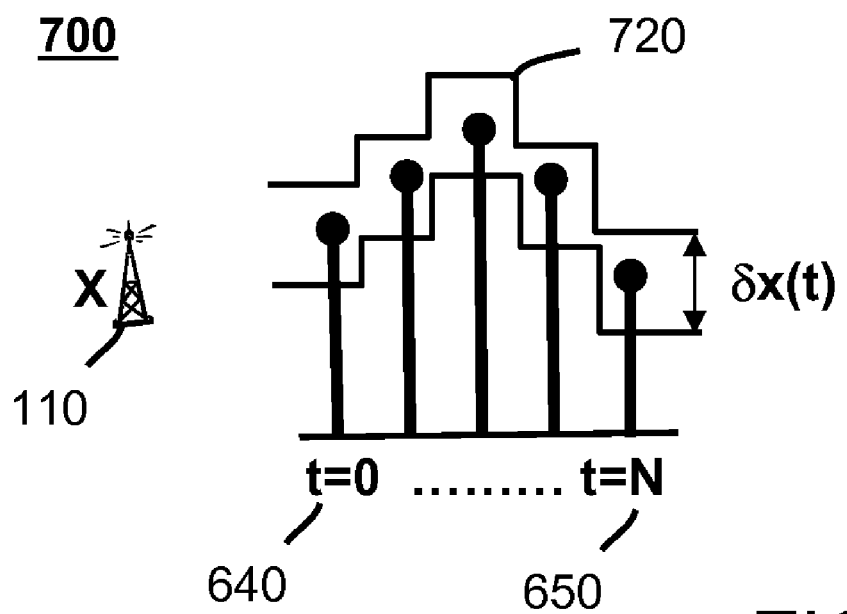
FIG. 7 is a plot of a RFTP signal within coverage variation limits in accordance with the embodiments of the invention.

Referring to FIG. 5, a method 500 for generating an RFTP is shown. The method 500 can be practiced with more or less that than the number of steps shown. To describe the method 500, reference will be made to FIGS. 4, 6, and 7 although it is understood that the method 500 can be implemented in any other suitable device or system using other suitable components. Moreover, the method 500 is not limited to the order in which the steps are listed in the method 500. In addition, the method 500 can contain a greater or a fewer number of steps than those shown in FIG. 5.

At step 502, the method can start. At method 502 GPS readings received by a tracking device can be tracked and stored for identifying one or more locations of the tracking device. For example, referring back to FIG. 4, one or more sets of GPS readings can be taken from the satellite 480 by the tracking device 160. The tracking device 160 can track and store one or more network readings including GPS data, cellular signals, RF signal strengths, and PAN coverage, for creating the RFTP. The GPS readings can be stored in a history buffer, such as a data store or memory. Notably, the tracking device 160 takes the GPS readings when GPS coverage is available. The tracking device 160 can also determine a time and location sequence from one or more network readings for characterizing a safe zone.

At step 506, a set of time-series communication patterns can be captured between the tracking device and one or more Personal Area Networks (PANs). For example, referring to FIG. 4, the tracking device 160 can record changes in PAN signals between the tracking device 160 and the PAN 104 and/or PAN 106. The set of time-series communication patterns between the tracking device 160 and the PANs can be determined in a manner similar to that shown in FIG. 6. Understandably, the PAN signals are received from the PANs instead of the cellular towers for determining the second set of time-series communication patterns.

At another step (not shown), a set of time-series communication patterns can be captured between the tracking device and one or more cellular towers. For example, referring to FIG. 4, the tracking device 160 can record changes in a RF communication signals sent between the tracking device 160 and the one or more cellular towers X (112), Y (114), and Z (110). For example, referring to FIG. 6, a first set of time-series communication patterns between the tracking device 160 and the cellular towers is shown. For example, a first time series communication pattern 620 can be recorded from cellular tower X 110. A second time series communication pattern 622 can be recorded from cellular tower Y 112. And, a third time series communication pattern 624 can be recorded from cellular tower Z 114. The time series communication pattern can be network readings including GPS data, cellular signals, or RF signal strengths.

At step 508 a pre-calibrated Radio Frequency Time Profile (RTFP) can be generated from the first set of time-series communication patterns and the second set of time-series communication patterns. As an example, the RFTP is a time signature of communication patterns between the tracking device 160, the PANs 104 and 106, and the one or more cellular towers (110, 112, 114) that is generated in response to changes in a location of the tracking device 160. For example, referring to FIG. 7, an RFTP trace for the communication signals recorded between the tracking device 160 and the cellular tower X (110) is shown. The RFTP trace can be captured over a time interval t=0 (640) to t=N (650). Notably, the RFTP trace can include a coverage variance 720 at each time step in the time interval. For example, multiple readings between the tracking device 160 and the cellular tower X (110) can be recorded at a multiple time steps. A variance of the recordings can be determined for identifying a coverage variance. Upon future RFTP readings, coverage variance will determine whether a received communication signal is validated based on the coverage variance of the reference RFTP. For example, an average of a time series communication signals should be expected to fall within the coverage variance 720, if the time series communication signals are captured along a pre-calibrated path. If the average does not fall within the coverage variance, a location of the tracking device 160 based on the RFTP trace cannot be validated. Understandably, the RFTP trace establishes a reference for identifying bounded changes in a communication signal pattern wherein the bounded changes occur along a physical pre-calibrated path. Notably, the RFTP consists of RFTP traces from one or more cellular towers and one or more PANs.

The steps 502, 506, and 508 are performed during a calibration period, or synchronization period, when the locations of the PANs are known and verified. Upon completion of the calibration period, the tracking device 160 can monitor changes in one or more sets of time-series communication patterns and compare the changes to the RFTP 700 acquired during the calibration period. Notably, the tracking device 160 can identify coverage transitions based on the RFTP acquired during the calibration period. At step 509, the method 500 can end. In particular, the steps 502, 506, and 508 of the calibration period can include characterizing a safe zone, such as an authorized location, through drive testing. Drive testing includes, taking the tracking along a path that may be traveled by a user wearing, or holding, the tracking device 160 for recording the time-series communication patterns to generate the RFTP.

For example, referring to FIG. 4, a common path, such as a street between the close home 410 and the far home 420 can be drive tested to generate a reference RFTP. That is, the tracking device 160 can be driven in a car along the street between the close home 410 and the far home 420 for characterizing one path. Multiple paths can be drive tested for creating the reference RFTP. The reference RFTP captures a time profile describing how readings of the communication signals from all network elements vary along a reported path. Likely paths are pre-calibrated via "drive testing" or "walk testing", where a tester walks a certain path and RF fingerprint information is recorded and uploaded to a database. That is, one or more paths are characterized by physically moving the device along the path and recording changes in communication signal behavior. The changes in the communication signal behavior can correspond to transition signatures which identify one or more locations of the tracking device 160. Moreover, a time and location sequence of the tracking device can be determined from changes in the network readings for characterizing a safe zone.

Figure 8:
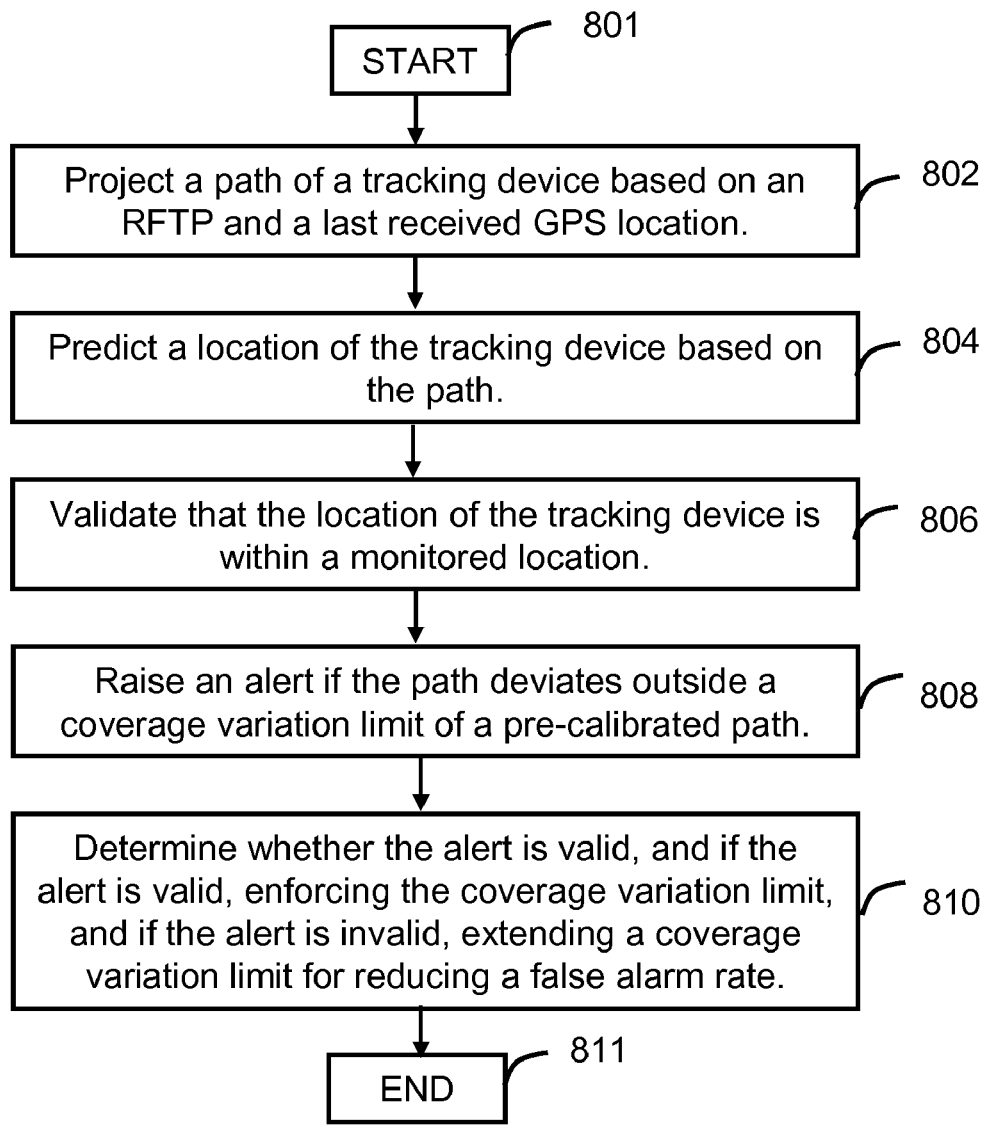
FIG. 8 is a method for determining an authorized location in accordance with the embodiments of the invention.

Referring to FIG. 8, a method 800 for determining an authorized location is shown. The method 800 can be practiced with more or less than the number of steps shown. To describe the method 800, reference will be made to FIG. 4 although it is understood that the method 800 can be implemented in any other suitable device or system using other suitable components. Moreover, the method 800 is not limited to the order in which the steps are listed in the method 800. In addition, the method 800 can contain a greater or a fewer number of steps than those shown in FIG. 8.

At step 801, the method can start. The method 800 can start in a state where a pre-calibrated (e.g. reference) RFTP has been generated for one or more paths of an authorized location, and where GPS coverage has recently become unavailable. At step 802, a path of the tracking device can be projected based on a present RFTP and one or more last received GPS locations. For example, referring to FIG. 4, the tracking device 160 at location C2 (452) may have previously received GPS data reporting an immediate location of the tracking device. For example, the last received GPS reading was at location B1 (452), the last cellular coverage was received by cellular tower X (110) at location Cl, and the current RFTP shows the tracking device 160 is in proximity of the PAN 104. The PAN 104 can project a path of the tracking device based on a history of the GPS readings, and the present RFTP. Accordingly, the path can be predicted as B1->C1.

At step 804, a location of the tracking device can be predicted based on the path. For example, referring to FIG. 4, the tracking device 160 at location C1 does not have coverage to GPS readings by the satellite 480. Accordingly, the PAN 104 can only rely on previous GPS readings and the RFTP. The RFTP can identify changes in communication signal readings between the tracking device 160, the PAN 104, and the cellular towers X (110) and Y (112) that provide reception to the tracking device 160. For example, the last received GPS reading was at location B1 (452), the last cellular coverage was received by cellular tower X (110) at location C1, and the current RFTP shows the tracking device 160 is in proximity of the PAN 104. Accordingly, the path can be predicted as B1->C1 with a predicted location of C2.

At step 806, the location of the tracking device can be validated within a monitored location in view of the pre-calibrated RFTP. For example, referring to FIG. 4, the tracking device 160 at location C2 (452) can be validated if the RFTP readings are within a coverage variance. For example, referring to FIG. 7, if the RFTP traces fall within the coverage variation limit 720, the location of the tracking device 160 can be validated.

At step 808, an alert can be raised if the path deviates outside a coverage variation limit of the pre-calibrated path. For example, referring to FIG. 4, if the tracking device 160 is at location C3 (460) an alert can be raised. At location C3 (460), the RFTP will not fall within coverage variation limits 720 associated with the safe zone of home 410. Moreover, a history of the communication pattern transitions when compared to the RFTP will reveal that the device has moved out of the safe zone of the home 410. That is, a time signature of recent movement when compared to the RFTP coverage variance indicates that movement outside the safe zone has occurred, and which corresponds to an unauthorized location. In particular, the tracking device 160 can validate a location when a history of the communication signal activity falls within a coverage limit variation, but cannot validate a location when the communication signal activity is greater than the coverage limit variation.

At step 810, a determination can be made as to whether the alert is valid. If the alert is valid, the coverage variation limit can be enforced. If the alert is invalid, a coverage variation limit can be extended for reducing a false alarm rate. The tracking device can update the RFTP based on one or more false alarms. In summary, the method 800 predicts a location of the tracking device along a path when GPS data for reporting a location of the tracking device is unavailable, determines whether the location is within a region of a last received GPS reading, and raises an alert if the location is outside a coverage variation limit of a pre-calibrated path. The tracking device 160 can learn changes in the RFTP based on an alarm rate, for reducing false alarm rates.

Figure 9:
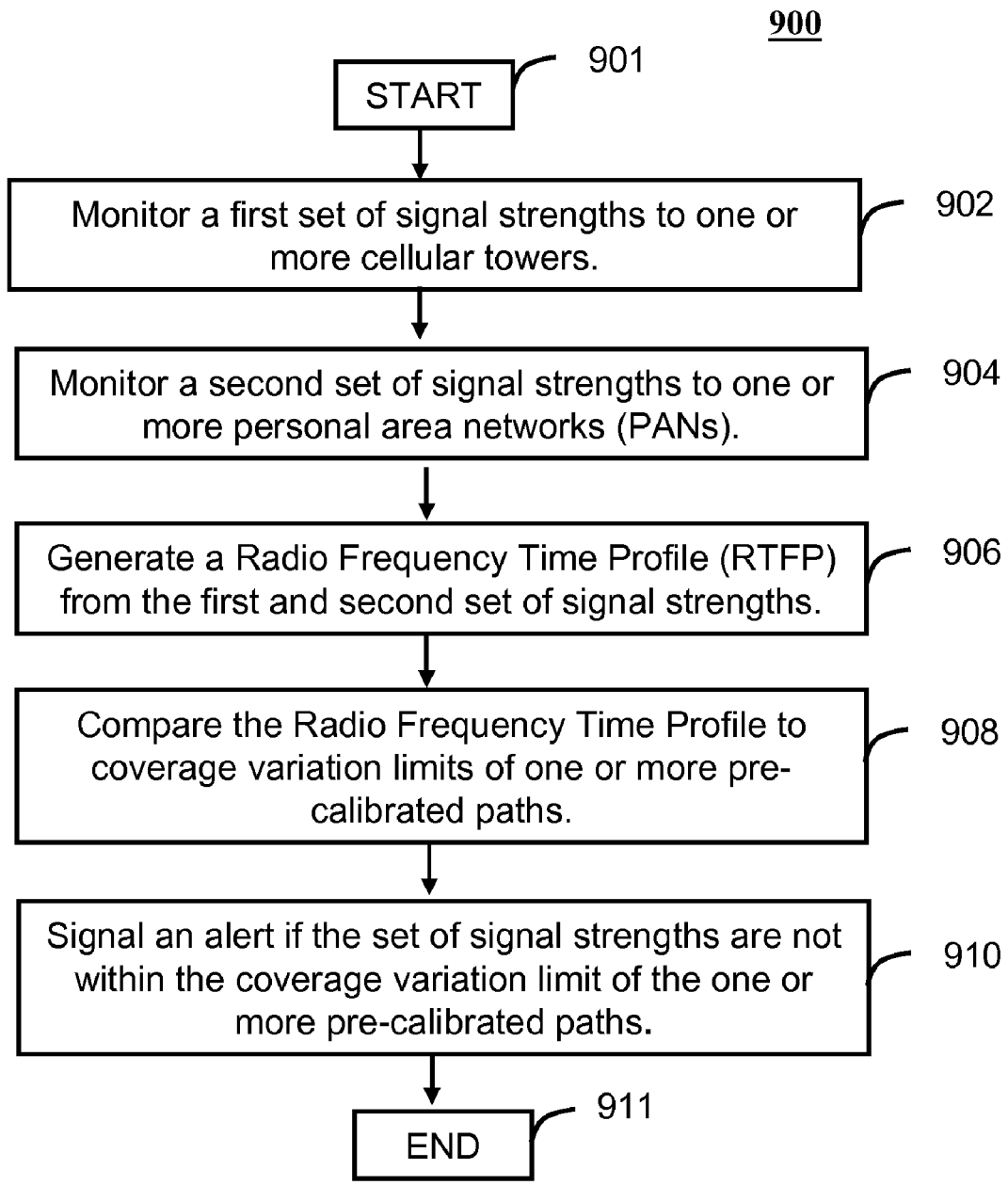
FIG. 9 is a method for validating a location of a tracking device based on a signal strength in accordance with the embodiments of the invention.
Figure 10:
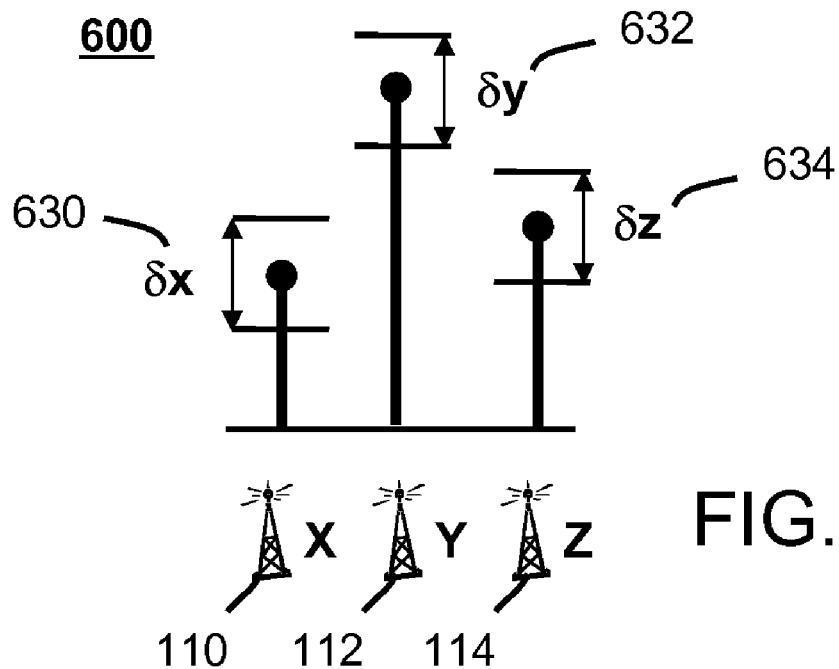
FIG. 10 is a diagram of a communication signal variation for one or more cellular towers in accordance with the embodiments of the invention.

Referring to FIG. 9, a method 900 for validating a location of a tracking device based on monitoring signal strengths is shown. The method 900 can be practiced with more or less than the number of steps shown. To describe the method 900, reference will be made to FIGS. 4, 7, and 10 although it is understood that the method 900 can be implemented in any other suitable device or system using other suitable components. Moreover, the method 900 is not limited to the order in which the steps are listed in the method 900. In addition, the method 900 can contain a greater or a fewer number of steps than those shown in FIG. 9.

At step 901, the method can start. At step 902, a set of signal strengths to one or more cellular towers can be monitored. For example, referring to FIG. 10, a set of signal strengths between the tracking device 160 and one or more cellular towers is shown. The signal strengths can be identified as a magnitude, a peak signal level, or an average signal level. A signal strength variation can also be associated with the signal strengths. For example, the tracking device 160 can reveal a signal strength variation $\delta x$ 630 with cellular tower X (110), a signal strength variation $\delta y$ 632 with cellular tower Y (112), and a signal strength variation $\delta z$ 634 with cellular tower Z (114). Notably, the signal strengths may vary depending on the cellular tower power and the distance from the cellular tower to the tracking device 160.

At step 904, a set of signal strengths to one or more personal area networks (PANs) can be monitored. For example, the tracking device 160 can reveal a signal strength variation $\delta p1$ 730 with PAN 104, and a signal strength variation $\delta p2$ 732 with PAN 106. Notably, the signal strengths may vary depending on the PAN power and the distance from the PAN to the tracking device 160. It should also be noted that the tracking device 160 and the PANs can communicate over a non-network assisted communication protocol including at least one from the group comprising: BlueTooth, ZigBee, IEEE 802.11, and two-way radio.

At step 906, a Radio Frequency Time Profile (RTFP) can be generated from the set of signal strengths, wherein the signal strengths change over time. The RFTP is a time series of the signal strengths between the tracking device and the one or more PANs resulting from a change in location of the tracking device. Briefly referring back to FIG. 7, the RFTP for the signal strengths can be calculated in a manner analogous to the RFTP 720 of FIG. 7. Notably, a coverage variation for the signal strength can be determined for each RFTP trace.

At step 908, the Radio Frequency Time Profile can be compared to coverage variation limits of one or more pre-calibrated paths. Notably, the RFTP includes a first set of signal strength indicators measured between the tracking device and the one or more cellular towers, and a second set of signal strength indicators measured between the tracking device and the one or more PANs. Referring to FIG. 4, the tracking device 160 monitors a first variation in the first set of signal strength indicators and a second variation in the second set of signal strengths over a time window for determining whether the variations are within a coverage variation limit of a monitored location.

At step 910, an alert can be signaled if the set of signal strengths are not within the coverage variation limit of the one or more pre-calibrated paths. For example, referring to FIG. 4, if the tracking device 160 moves to location C3 (460), the signal strength indicators to the PAN 104 and the signal strength indicators to the PAN 106 will change in a manner that is not consistent with signal strength coverage variation limits of the RFTP.

Figure 11:
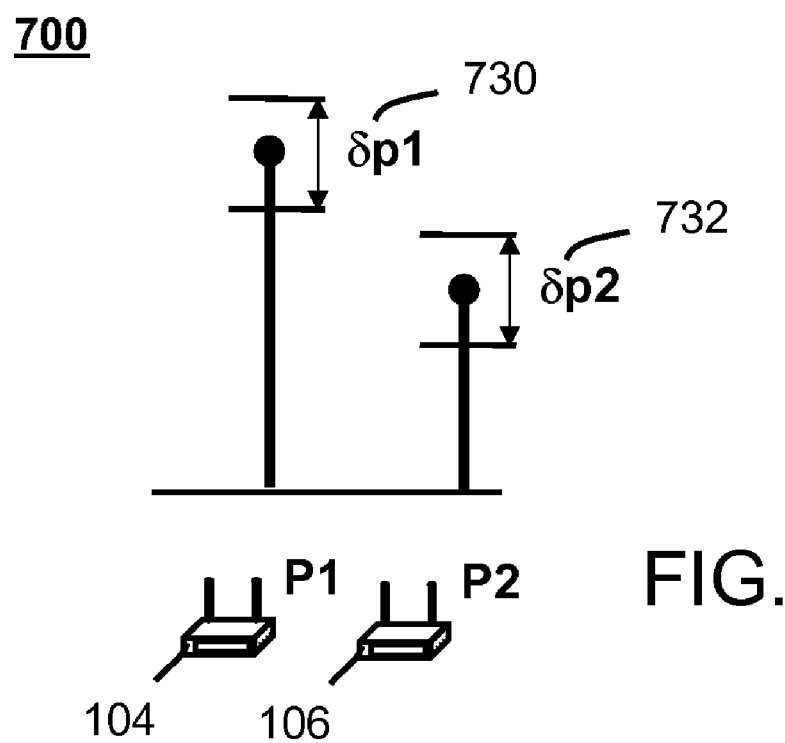
FIG. 11 is a diagram of a communication signal variation for one or more Personal Area Networks in accordance with the embodiments of the invention.
Figure 12:
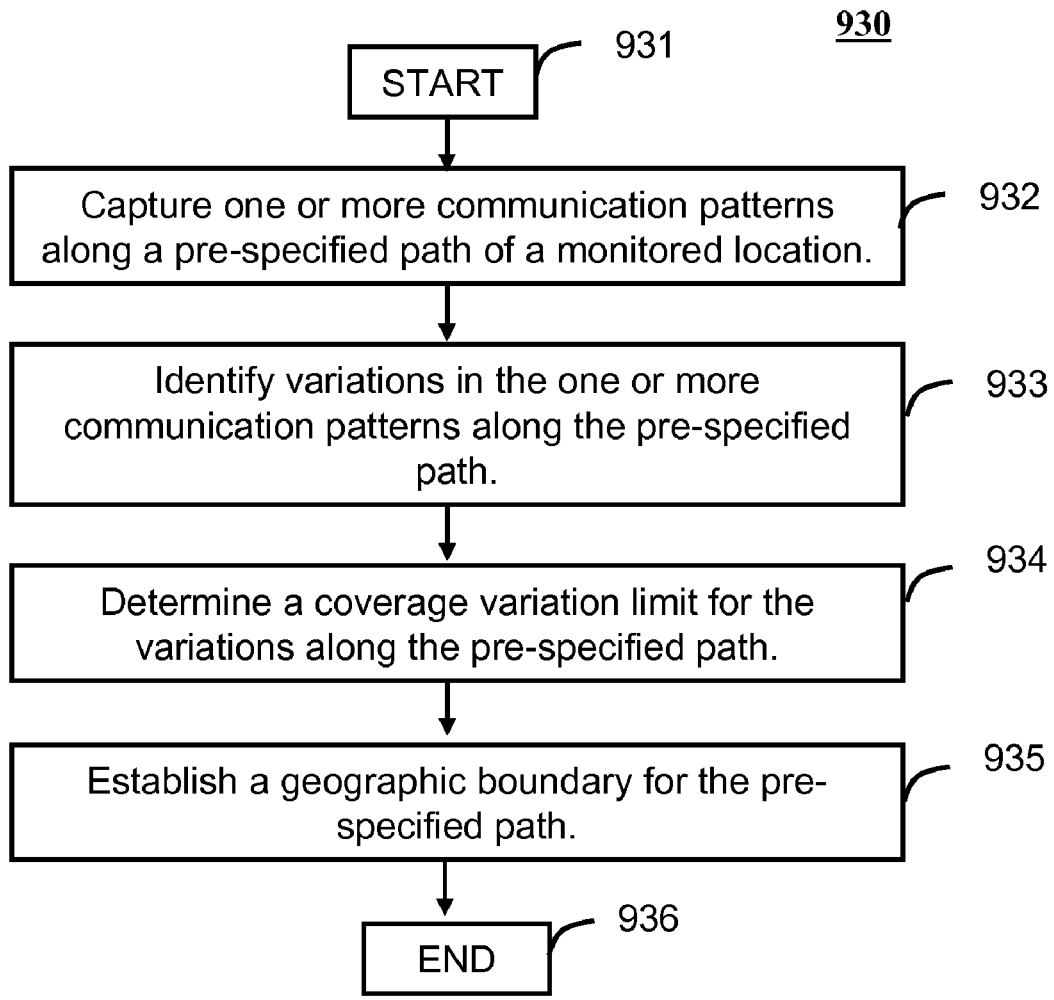
FIG. 12 is a method for creating pre-calibrated coverage variation patterns in accordance with the embodiments of the invention.

Referring to FIG. 12, a method 930 for creating pre-calibrated coverage variation patterns during a pre-calibration period is shown. The method 930 can be practiced with more or less than the number of steps shown. To describe the method 930, reference will be made to FIGS. 10 and 11 although it is understood that the method 900 can be implemented in any other suitable device or system using other suitable components. Moreover, the method 900 is not limited to the order in which the steps are listed in the method 900. In addition, the method 930 can contain a greater or a fewer number of steps than those shown in FIG. 10.

At step 931, the method 930 can start. At step 932, one or more communication patterns can be captured along a pre-specified path of a monitored location. At step 933, variations in the one or more communication patterns can be identified along the pre-specified path. At step 934, a coverage variation limit can be determined for the variations along the pre-specified path. At step 935, a geographic boundary can be established for the pre-specified path. Upon creation of the pre-calibrated coverage variation patterns, signal strengths in the RFTP for current locations can be compared to the coverage variation limit for determining whether a location of the tracking device is within the geographic boundary.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention are not so limited. Numerous modifications, changes, variations, substitutions and equivalents will occur to those skilled in the art without departing from the spirit and scope of the present embodiments of the invention as defined by the appended claims.

What is claimed is:

1. A tracking system for validating a location suitable for use with location Positioning Systems, comprising:
    a tracking device that generates a Radio Frequency Profile (RFTP);
    one or more personal area network units (PANs) communicatively coupled to the tracking device; and
    a processor operable to:
        receive GPS data reporting an immediate location of the tracking device;
        project a path of the tracking device based on a history of the RFTP;
        predict a location of the tracking device along the path;
        determine whether the location is within a region of a last received GPS reading;
        raise an alert if the location is outside a coverage variation limit of a pre-calibrated path; and
    wherein the RFTP is a signature of communication patterns recorded between the tracking device, the PAN, and, if present, one or more external communications systems, and the tracking system validates a location of the tracking device based on the RFTP.

2. The tracking system of claim 1, wherein the tracking system monitors the RFTP for communication pattern transitions, and signals an alert if the communication pattern transitions are outside a coverage variation limit of a monitored location.

3. The tracking system of claim 1, wherein the tracking system validates the immediate location reported by the GPS in view of the path.

4. The tracking system of claim 3, wherein the tracking system
    predicts the location of the tracking device along the path when GPS data for reporting a location of the tracking device is unavailable.

5. The tracking system of claim 3, wherein the tracking device tracks and stores one or more network readings including GPS data, cellular signals, RF signal strengths, and PAN coverage, for creating the RFTP.

6. The tracking system of claim 5, wherein the tracking system determines changes in a time and location sequence of the tracking device from the network readings for characterizing a safe zone.

7. The tracking system of claim 1, wherein the RFTP includes a first set of signal strength indicators measured between the tracking device and the one or more cellular towers, and a second set of signal strength indicators measured between the tracking device and the one or more PANs,
    wherein the tracking device monitors a first variation in the first set of signal strength indicators and a second variation in the second set of signal strengths over a time window for determining whether the variations are within a coverage variation limit of a monitored location.

8. The tracking system of claim 1, wherein the tracking system updates the RFTP based on one or more false alarms.

9. The tracking system of claim 1, wherein the PAN includes a positional detector for determining whether the PAN has moved from a pre-specified location.

10. The tracking system of claim 1, wherein the tracking device and the PAN communicate over a non-network assisted communication protocol including at least one from the group comprising: BlueTooth, ZigBee, IEEE 802.11, and two-way radio.

11. The tracking system of claim 1, wherein the tracking device further comprises:
    a modem for acquiring a coverage pattern from one or more cellular towers and at least one personal area network unit; and
    a processor for determining whether a variation in the coverage pattern is within a monitored location,
    wherein the processor captures one or more RF signals from the modem, determines a signal strength of the one or more RF signals, and compares the coverage pattern with a coverage variation limit of a monitored location.

12. The tracking system of claim 1, wherein the personal area network unit further comprises:
    a first modem for establishing communication with one or more cellular towers or other PANs;
    a second modem for establishing non-network assisted communication with the tracking device; and
    a monitoring unit for comparing the RTFP with one or more communication patterns from the one or more cellular towers or other PANs.

* * * * *